INVENTOR
ALEXANDER H. FREY JR.

BY Edward S. Gershuny
AGENT

United States Patent Office 3,475,725

Patented Oct. 28, 1969

3,475,725

ENCODING TRANSMISSION SYSTEM

Alexander H. Frey, Jr., Gaithersburg, Md., assignor to International Business Machines Corporation, Armonk, N.Y., a corporation of New York Filed Dec. 6, 1966, Ser. No. 599,467
Int. Cl. G08b 29/00; G06f 11/00
U.S. Cl. 340—146.1 5 Claims

ABSTRACT OF THE DISCLOSURE

This invention relates to transmission systems and is more particularly concerned with the transmission of data signals and error detection and correction signals in such a manner that the source of data need never be turned off. The transmission system comprises a source of data signals, encoding means, control means and combining means.

This invention relates to transmission systems and is more particularly concerned with the transmission of data signals and error detection and correction signals in such a manner that the source of data need never be turned off.

In digital computers and in data transmission systems, binary code sequences are frequently employed. These binary code sequences take the form of trains of positive and negative electrical pulses representing zero and one data bits. In data transmission systems which are subject to noise, suitable error correcting codes have been developed to provide a means for detecting and correcting errors. The widest and most variable class of codes in present use is called polynomial codes. Polynomial codes are implemented by using the basic properties of division for polynomials.

In prior devices utilizing polynomial codes, signals, representing data bit sequences typically are encoded by dividing a polynomial representation of the data bits by a coding polynomial P thus obtaining a remainder R. The remainder comprises error checking bits and is transmitted as a signal following the data signal, the total comprising a message group signal M. This message may be preceded by a framing signal which marks the beginning of the message. At the receiver the framing signal will cause the decoding circuits to be cleared and to sense the beginning of a message. The decoder then proceeds to divide the message by the coding polynomial P. The remainder result of this division will be zero if no errors occurred during the transmission.

Since, in the prior art apparatus, the error detection and correction signal is transmitted following the data signal, transmission of data signals must be interrupted or delayed during the time that it takes to transmit the error detection and correction signal. This, of course, is costly in terms of controls and storage because of the considerably large amount of message time allocated to the error detection and correction signal will interrupt or delay data signals.

It is therefore a principal object of this invention to transmit data signals and error detection and correction signals in such a manner that the transmission of data need never be interrupted.

It is a further object of this invention to transmit data signals and error detection and correction signals in such a manner that the transmission of data need not be delayed.

The above and related objects are accomplished in accordance with one aspect of this invention by providing a source of first signals each of which may represent a block of data, and two encoders for deriving a second signal from a data signal by dividing a polynomial representation of the data signal by a coding polynomial. The second signal is the error detection and correction signal. Input control means is also provided to direct successive data signals to alternate ones of the encoders. While an encoder is dividing the polynomial representation of a data signal by a coding polynomial, the data signal is simultaneously transmitted by the system without interruption. After a data signal has gone through the system, one of the encoders will contain an error detection and correction signal which was generated as a result of the polynomial division process. The next data signal is then switched to the other encoder which will derive a second error detection and correction signal while the second data signal is transmitted without interruption. While the second data signal is being transmitted, combining means will cause the error detection and correction signal that was derived from the previous data signal to be combined with the second data signal and transmitted with it. Thus, the output signal emanating from the system comprises a data signal combined with the error detection and correction signal that was derived from a previous data signal.

In accordance with another aspect of the invention, only one encoder is used. The single encoder has auxiliary memory means assoicated with it. After a first data signal has passed in an uninterrupted manner through the system, the encoder will contain an error detection and correction signal which was derived by dividing a polynomial representing the data signal by a coding polynomial. After the data signal has gone through the system, the error detection and correction signal is transferred to the associated auxiliary memory. Then, while another error detection and correction signal is being derived from a succeeding data signal, the error detection and correction signal that was derived from the first data signal will be combined with the second data signal as it is transmitted by the system.

One advantage of this invention is that signals coming into the system may be continuously transmitted by the system. Because error correction signals are combined with data signals, there is no need to turn off the source of data when error correction signals are being transmitted.

The fact that each output signal emanating from the system contains a mixture of a first signal representative of data and a second signal representative of redundancy derived from a previous block of data leads to a further advantage of this invention. Because of this feature, the errors generated by a single burst will be divided between two bocks of information. That is, a burst is likely to affect data in a first data signal and redundancy derived from another data signal. Since each of the two affected data and redundancy signals will contain only half of the errors caused by the burst, each signal will have fewer errors to correct and the error correcting capabilities of the transmission system will be improved.

The foregoing and other objects, features and advantages of the invention will be apparent from the following and more particular description of preferred embodiments of the invention, as illustrated in the accompanying drawings.

Figure 1:
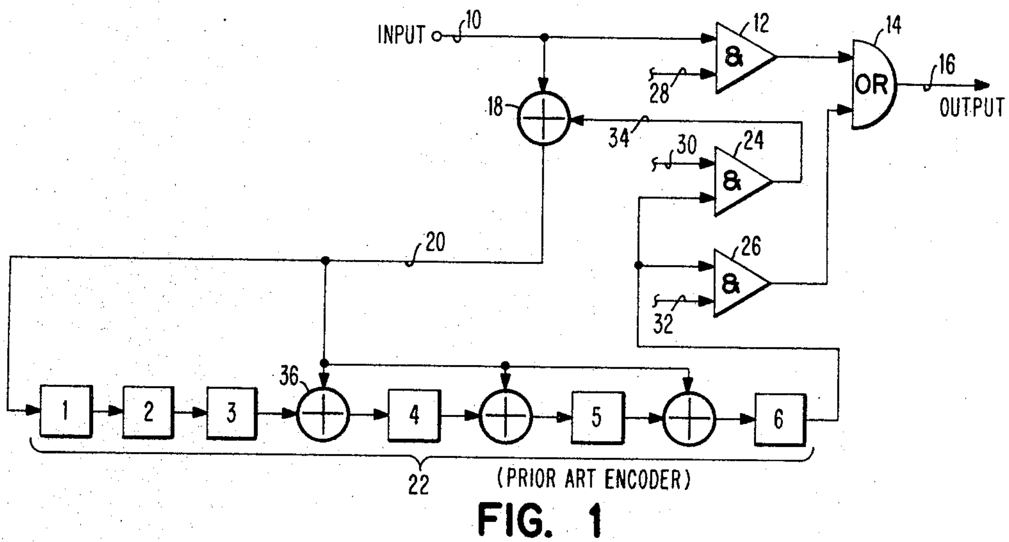
FIG. 1 shows a prior art polynomial encoder.

In order to more fully understand the present invention, a brief review of polynomial coding techniques will precede the detailed description of the invention.

A series of data bits, binary zeros and ones, may be represented as a polynomial having X's raised to descending powers with coefficients of zero or one depending upon the digits of the data bits.

A sequence of K digits $A_{K-1}, A_{K-2} \ldots A_1, A_0$ may then be represented by a polynomial D(X):

$$(1)\quad D(X)=A_{K-1}X^{K-1}+A_{K-2}X^{K-2}+\ldots+A_1X+A_0$$

P(X) represents a second sequence of bits of a suitably chosen coding polynomial. The degree of P(X) is denoted by $r$.

The first step in a commonly used coding scheme is to multiply D(X) by X raised to the power $r$ to obtain:

$$(2)\quad X^rD(X)=A_{K-1}X^{r+K-1}+A_{K-2}X^{r+K-2}+\ldots+A_1X^{r+1}+A_0X^r$$

For example, the bit sequence 101011 is equivalent to the polynomial $D(X)=1X^5+0X^4+1X^3+0X^2+1X+1$, arranging higher order coefficients from left to right, in the bit sequence. If $r=6$, then $$x^rD(X)=1X^{11}+0X^{10}+1X^9+0X^8+1X^7+1X^6+0X^5+0X^4+0X^3+0X^2+0X+0$$

Written in binary form this becomes 101011000000, which is equivalent to shifting the original bit sequence six places to the left.

The next step is to divide $X^rD(X)$ by the coding polynomial P(X). Addition and subtraction are carried out modulo two, which is represented by the symbol $\oplus$. The result of this division is a quotient Q(X) and a remainder R(X), the degree of R(X) being less than $r$, the degree of the coding polynomial.

$$(3)\quad \frac{X^rD(X)}{P(X)}=Q(X)\oplus\frac{R(X)}{P(X)}$$

Equation 3 can be rewritten as:

$$(4)\quad X^rD(X)=P(X)Q(X)\oplus R(X)$$

Let M(X) represent the transmitted message polynomial which includes the original data plus the error checking bits, R(X):

$$M(X)=X^rD(X)\oplus R(X)=P(X)Q(X)$$

(Note that addition and subtraction modulo two give the same result.)

The coefficients M of M(X) are the bits transmitted over the channel, which are actually the data bits followed by the remainder bits.

In the example given above, let $P(X)=1X^6+1X^5+1X^4+1X^3+0X^2+0X+1$. Then the division of $X^6D(X)$ by $P(X)$ will be as shown below:

$$\begin{array}{r}
X^5+X^4+X^3+X^2+1\\
X^6+X^5+X^4+X^3+1\,\overline{)\,X^{11}+0X^{10}+X^9+0X^8+X^7+X^6+0X^5+0X^4+0X^3+0X^2+0X+0}\\
\underline{X^{11}+X^{10}+X^9+X^8+X^5}\\
X^{10}+X^8+X^7+X^6+X^5\\
\underline{X^{10}+X^9+X^8+X^7+X^4}\\
X^9+X^6+X^5+X^4\\
\underline{X^9+X^8+X^7+X^6+X^3}\\
X^8+X^7+X^5+X^4+X^3\\
\underline{X^8+X^7+X^6+X^5+X^2}\\
X^6+X^4+X^3+X^2\\
\underline{X^6+X^5+X^4+X^3+1}\\
1X^5+0X^4+0X^3+1X^2+0X+1
\end{array}$$

The remainder of this division is: $1X^5+0X^4+0X^3+1X^2+0X+1$ or 100101 in binary form.

Since $X^6D(X)$ is equivalent to 101011000000, then $X^6D(X)\oplus R(X)$ is equivalent to $$101011000000\oplus100101=101011100101=M$$

The sequence of bits represented by M is transmitted, higher order bits first, to a receiver. The received bits are represented by M'. If transmitted without error, $M'=M$.

At the receiver, assuming $M=M'$, then M(X), the polynomial having coefficients corresponding to M, is divided by P(X). Since no errors have occured during transmission, the remainder of this division will be equal to zero. This is proven by considering the result of dividing M(X) by P(X):

$$\frac{M(X)}{P(X)}=\frac{X^rD(X)}{P(X)}\oplus\frac{R(X)}{P(X)}.$$

From Equation 3

$$\frac{X^rD(X)}{P(X)}=Q(X)\oplus\frac{R(X)}{P(X)}$$

Therefore:

$$\frac{M(X)}{P(X)}=Q(X)\oplus\frac{R(X)}{P(X)}\oplus\frac{R(X)}{P(X)}=Q(X)+0.$$

Hence, assuming that no errors occurred in transmission, the remainder of this division is equal to zero. If, however, an error occurred in the message the division will yield the remainder which is not equal to zero, indicating that an error occurred.

Prior art apparatus which may be used to implement the code described above is shown in FIG. 1. The coding polynomial used in this example is $$P(X)=1X^6+1X^5+1X^4+1X^3+1$$

For simplicity, many of the details concerning clocking information, shift lines, etc. have been omitted from the drawing of the prior art apparatus. This conforms to acceptable practice in the art. Additional examples may be found in W. W. Peterson, "Error-Correcting Codes," The M.I.T. Press 1961. The input line 10 is connected to one input of a two-input AND circuit 12 the output of which is connected to one input of an OR circuit 14 the output of which is connected directly to an output line 16. The input line 10 is also connected to one of the inputs of modulo two adder 18. The output 20 of modulo two adder 18 provides inputs to a shift register 22 the stages of which are identified by the numerals 1 through 6. The lower numbers correspond to the lower order stages of the shift register, and shifting is accomplished from left to right. The output of the last stage 6 of the shift register is fed to AND circuits 24 and 26. The output of AND circuit 24 feeds the second input of modulo two adder 18. The output of AND circuit 26 feeds a second input of OR circuit 14. Since the last stage of the shift register 22 is fed back via modulo two adder 18 to be added to other stages of the shift register, this arrangement is commonly called a "linear feed-back shift register."

During encoding of message bits, in the apparatus shown, the shift register 22 is first cleared of all information by a clocking pulse (not shown). Initially AND circuit 12 is energized by a timing signal which opens the gate circuit 28 to allow the data input on line 10 to pass directly through the AND circuit 12, through the OR circuit 14 to the output line 16. AND circuit 24 is initially energized by gate line 30, while AND circuit 26 is initially deenergized by gate line 32. Thus, the output of the last stage 6 of the shift register 22 is fed back through AND circuit 24 via line 34 to the modulo two adder 18, where it is added, modulo two, to the input data from line 10.

Thus, the data input appears six shifts ahead of stage 1 of the shift register. This is equivalent to a multiplication of the input by $X^6$. The feedback lines emanating from line 20 insert feedback information into the shift register to complement such shifted positions as correspond to the coding polynomial. For example, modulo two adder 36 complements the output of position 3 corresponding to the term $X^3$ of P(X). This accomplishes a division of the data input by the coding polynomial whereby only the remainder bits R(X) remain in the shift register after all data bits have arrived at the input 10.

After all of the information bits have been received, a timing pulse de-energizes lines 28 and 30 thereby blocking data from passing to the output line and also blocking the feedback from the shift register output stage 6. At the same time, line 32 is energized to permit the contents of the shift register to be shifted out through AND gate 26 and OR circuit 14 to the output line. Thus, following the data bits, the remainder of the division by the coding polynomial is shifted out and added to the end of the message.

The following table illustrates the contents of the shift register during the encoding of the data bit sequence 101011.

| | Shift Register Stages | | | | | |
|---|---|---|---|---|---|---|
| Input | 1 | 2 | 3 | 4 | 5 | 6 |
| Reset | 0 | 0 | 0 | 0 | 0 | 0 |
| 1 | 1 | 0 | 0 | 1 | 1 | 1 |
| 0 | 1 | 1 | 0 | 1 | 0 | 0 |
| 1 | 1 | 1 | 1 | 1 | 0 | 1 |
| 0 | 1 | 1 | 1 | 0 | 0 | 1 |
| 1 | 0 | 1 | 1 | 1 | 0 | 0 |
| 1 | 1 | 0 | 1 | 0 | 0 | 1 |

The remainder is $1X^5+0X^4+0X^3+1X^2+0X+1$. When the remainder bits are added to the end of the data bits, the transmitted message becomes 101011100101. The higher order bits are transmitted first.

A decoder which would check the accuracy of a transmitted message is similar in most respects to the encoder discussed above and will not be described herein. For a description of a decoder with its associated error detecting circuitry and a description of a more sophisticated encoder, reference is made to my copending application Ser. No. 326,879 for "Simultaneous Message Framing and Error Detection" filed Nov. 29, 1963 and assigned to the same assignee as this application.

As is clear from the above description of a prior art encoder, the prior art device cannot transmit data continuously. That is, after six data bits (101011 in the example given above) have been transmitted, transmission of further data bits must be interrupted until the six remainder bits (100101 in the above example) have also been transmitted. Various prior art attempts to provide encoding apparatus capable of continuously accepting input data have resulted in complex and expensive devices utilizing large buffer memories and a great variety of other additions to the basic encoding circuit.

Figure 2:
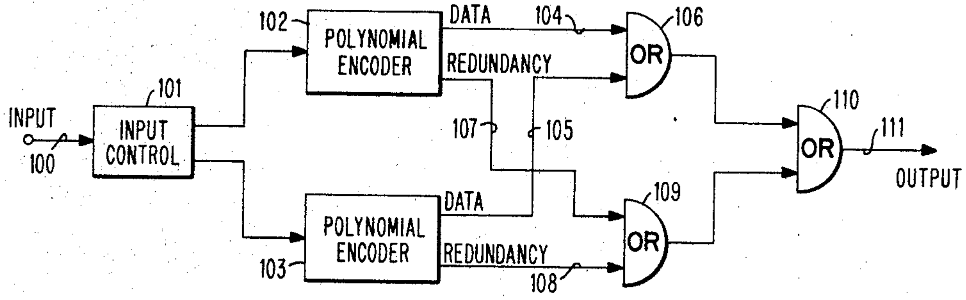
FIG. 2 shows a block diagram of a first embodiment of the invention using a plurality of polynomial encoders.

Referring to FIG. 2, there is shown a simple block diagram of one embodiment of this invention which permits an encoder to process data continuously.

Bits of information come into the encoding system on line 100. In order to calculate and temporarily store redundancy bits, polynomial encoders 102 and 103 are provided. The input control 101 acts as a switching means to direct successive blocks of data to one of the polynomial encoders 102 and 103. Each of the polynomial encoders has two outputs, one output for data bits and one output for redundancy bits. The data outputs 104 and 105 of polynomial encoders 102 and 103 are connected to the inputs of OR circuit 106. The redundancy outputs 107 and 108 of polynomial encoders 102 and 103 are connected to the inputs of OR circuit 109. In order to interleave data and redundancy bits, the outputs of OR circuits 106 and 109 are connected to the inputs of OR circuit

110, the output of which is connected directly to the output line 111 of the encoding and transmitting system.

The operation of the encoding transmitter shown in FIG. 2 will be made clear by the following example. Assume that 101011, 011101 and 111001 are three consecutive blocks of data bits that come into the encoding system. If the encoding polynomial is $$P(X)=X^6+X^5+X^4+X^3+1$$

then the remainders R(X) calculated for the blocks of data will be 100101, 100010 and 001111 respectively. When the first block of data (101011) enters the system over line 100, it will be directed by the input control 101 to polynomial encoder 102. After the data bits have passed through the system, the remainder 100101 will be contained within the shift register of polynomial encoder 102. The next block of data (011101) will then be directed by the input control 101 to polynomial encoder 103. As the data bits 011101 pass through the encoding system, the remainder bits 100101 that were calculated for the previous block of data will be inserted between the data bits that are passing through the encoding system. Thus, the bit sequence 011010110011 will appear on the output line 111. The first, third, fifth, seventh, ninth, and eleventh bits appearing in the message block on line 111 will be data bits. The second, fourth, sixth, eighth, tenth, and twelfth bits of the message block will be remainder bits that were calculated from the previous block of data. The bit frequency on the output line 111 will be twice the bit frequency on the input line 100.

After the data bits 011101 have passed through the encoding system, the remainder bits 100010 will be contained in the shift register of polynomial encoder 103.

The next block of data bits (111001) will then be directed by the input control 101 to polynomial encoder 102. As the data bits 111001 pass through the encoding system, the remainder bits 100010 that were calculated from the previous block of data will be inserted between them. Thus, the message block appearing on output line 111 will have the bit sequence 111010000110. The first, third, fifth, seventh, ninth, and eleventh bits will be those of the data block 1110001 while the second, fourth, sixth, eighth, tenth, and twelfth message bits will be those of the remainder 100010 calculated from the previous block of data.

In order to avoid timing problems, it is preferred that both of the polynomial encoders 102 and 103 be furnished with timing information from a single main clock (not shown in FIG. 2). The clock should operate at the output bit frequency of the system; that is, at twice the input bit frequency.

In order to satisfy the timing requirements of the system shown in FIG. 2, the polynomial encoder shown in FIG. 1 must be modified before it is incorporated into the system.

Figure 3:
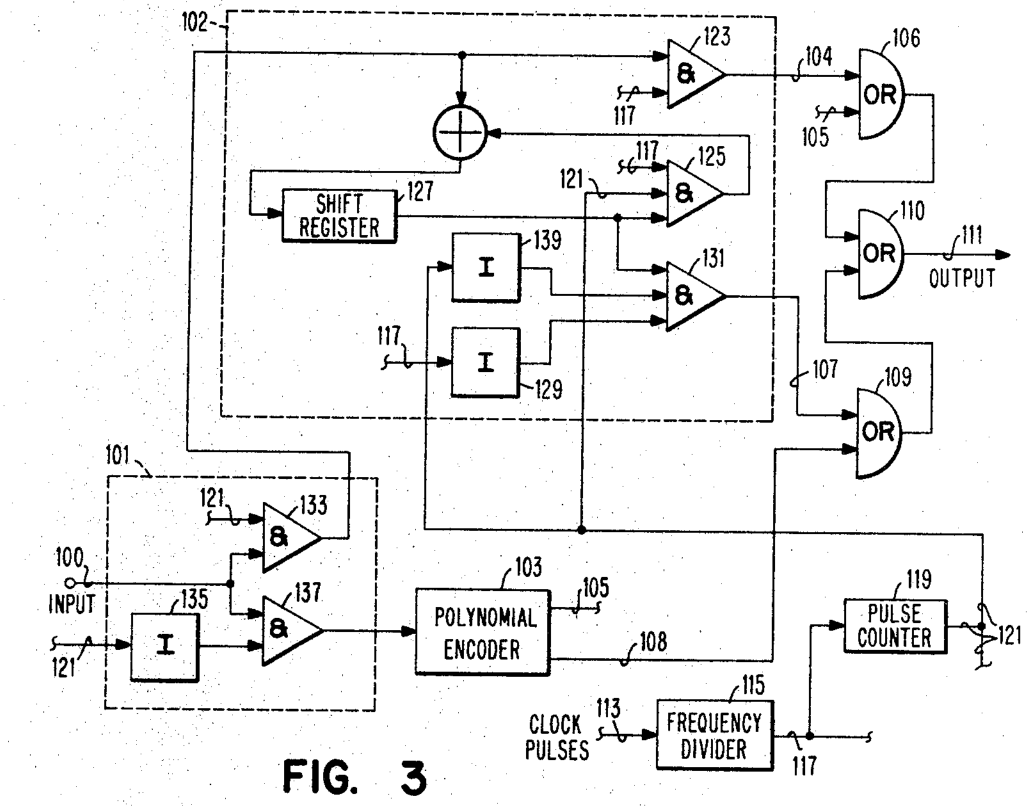
FIG. 3 shows the first embodiment of the invention in more detail.

Referring to FIG. 3, the encoding system is shown in more detail. Clocking pulses are received on line 113. The clocking pulses received on line 113 correspond to the output bit frequency of the system and therefore occur at twice the input bit frequency. In order to provide timing control for the output data and redundancy bits, the frequency of the clock pulses occurring on line 113 is divided in half by the frequency divider 115. The frequency divider 115 may be any of a number of known devices. For example, it could simply be a bistable flip-flop the output of which changes each time that the input signal rises. In order to provide a timing signal which will cause successive blocks of incoming data to be switched alternately to one polynomial encoder or the other, the output 117 of the frequency divider 115 may be fed to a pulse counter 119. The level of the output 121 of the pulse counter 119 will change after each block of data bits has been received. The output 117 of the frequency divider 115 is fed directly to AND circuits 123 and 125 to supply timing control for data bits passing through the system and for the shift register 127 which calculates a remainder while the data bits are fed to OR circuit 106. The output 117 of frequency divider 115 is inverted by inverter circuit 129 before going to AND circuit 131 to supply timing information for output remainder bits. The output 121 of the pulse counter 119 goes directly to AND circuit 133 so that the "high" output of the pulse counter will cause data bits to be directed to the polynomial encoder 102. The output of the pulse counter is inverted by inverter circuit 136 before being sent to AND circuit 137 so that the "low" output of the pulse counter will cause a block of data to be directed to the polynomial encoder 103. The output 121 of the pulse counter 119 feeds AND circuit 125 to permit feedback to shift register 127 when data bits are being directed to polynomial encoder 102, and it is also inverted by inverter circuit 139 the output of which feeds AND circuit 131 so that, while data bits are being directed to polynomial encoder 103, remainder bits may be taken from polynomial encoder 102. Since the polynomial encoders 102 and 103 will be substantially identical in design, only the details of polynomial encoder 102 are shown in FIG. 3.

The operation of the encoding system is as follows. When the output 121 of pulse counter 119 is at its high value, data signals entering the system on input line 100 will pass through AND circuit 133 to polynomial encoder 102. The signal on line 121 is inverted by inverter circuit 135 to prevent the data from passing through AND circuit 137 to polynomial encoder 103. The signal on line 121 is also fed to one input of AND circuit 125 to permit feedback to the shift register 127 within polynomial encoder 102. In polynomial encoder 103, the signal appearing on line 121 will be inverted before being fed to one input of an AND circuit within the shift register feedback loop in order to prevent feedback to the shift register while data is being encoded in polynomial encoder 102. The signal appearing on line 121 is fed through inverter 139 to AND circuit 131 within polynomial encoder 102 to prevent remainder bits from leaving polynomial encoder 102. In polynomial encoder 103, the signal on line 121 will be fed directly (without inversion) to one input of an AND circuit in order to permit a remainder calculated from the previous block of data to be shifted out from polynomial encoder 103 while the remainder for the new block of data is being calculated in polynomial encoder 102. The timing signal appearing on line 117 (having a frequency equal to one-half that of the main timing signal appearing on line 113) feeds AND circuits 123 and 125 of polynomial encoder 102 to control respectively the output of data bits from polynomial encoder 102 and the feedback to the shift register 127. Line 117 supplies timing information to polynomial encoder 103 in the same manner.

After all of the bits of a block of data have gone through the polynomial encoder 102, the remainder of the division by the coding polynomial P(X) will be contained within the shift register 127. At this time the output 121 of the pulse counter 119 will go to its low state to direct the next block of data to polynomial encoder 103. Feedback to the shift register 127 will then be blocked by AND circuit 125. The signal on line 121, after being inverted by inverter 139, will permit the remainder bits contained within shift register 127 to be shifted out through AND circuit 131 between the data bits that come from polynomial encoder 103. Timing information for the output remainder bits is supplied by the clock pulses appearing on line 117 and inverted by inverter circuit 129 before being fed to AND circuit 131. This will insure that the remainder bits appearing on output line 111 are positioned in time between the data bits also appearing on line 111.

Although, in the above example, the pulse counter 119 was used to control the switching of successive data blocks. For example, the beginning of a new block of it will be recognized by those skilled in the art that a variety of other methods could be used to switch the data blocks. For example, the beginning of a new block of data could be sensed in any of the ways shown in my copending application Ser. No. 326,879 already incorporated by reference into this specification. Each time that the beginning of a new block of data is sensed, it would be directed to whichever polynomial encoder had not been used to calculate the remainder for the previous block of data. Since all of the examples given in my referenced copending application may be used in implementing the present invention, the various techniques of message framing will not be discussed further here.

Figure 4:
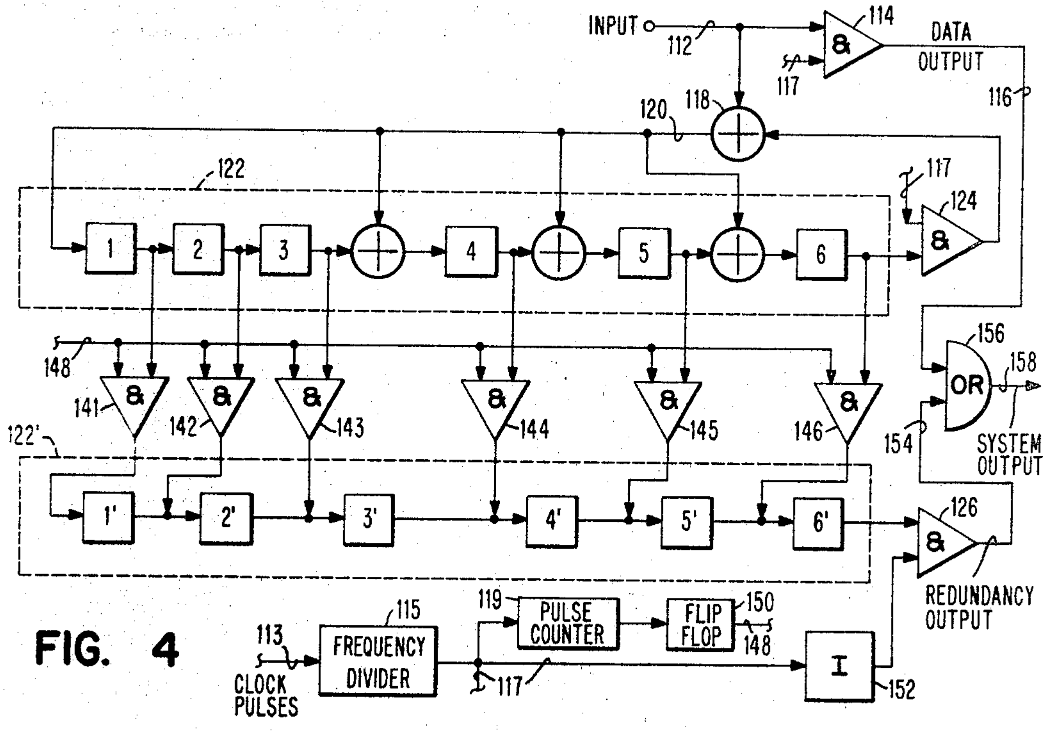
FIG. 4 shows a second embodiment of the invention using a single polynomial encoder.

Referring to FIG. 4, another embodiment of the invention is shown wherein only one polynomial encoder is needed. The encoding system of FIG. 4 again assumes a coding polynomial $P(X)=X^6+X^5+X^4+X^3+1$.

As in a standard polynomial encoder, there is provided a shift register 122 having a number of stages equal to the degree of the coding polynomial, and having appropriate feedback connections to reduce a stream of data bits modulo the coding polynomial. In accordance with this invention, in order to store the redundancy bits that have been calculated, a second shift register 122' is provided which also has a number of stages equal to the degree of the coding polynomial. The output of each of the stages 1 through 6 of shift register 122 is connected to one input of an AND circuit 141 through 146 respectively, the output of each of which is connected to the input of a corresponding stage of shift register 122'. That is, stage 6, the highest order stage of shift register 122 is connected through AND circuit 146 to stage 6', the highest order stage of shift register 122'; stage 5, the next highest order stage of shift register 122 is connected through AND circuit 145 to stage 5', the highest order stage of shift register 122'; . . . and the output of stage 1, the lowest order stage of shift register 122 is connected through AND circuit 141 to the input of stage 1', the lowest order stage of shift register 122'. Connected to the second input of each of the AND circuits 141 through 146 is line 148. When a pulse occurs on line 148, the AND circuits 141 through 146 will permit the remainder bits R(X) contained in stages 1 through 6 of shift register 122 to be transferred into stages 1' through 6' of shift register 122'.

Timing information is supplied to the system in a manner similar to that described above in connection with FIG. 3. Clocking pulses at the output bit frequency come into the system on line 113 into the frequency divider 115. The output 117 of the frequency divider then becomes a source of clock pulses at the input bit frequency (that is, at one-half the output bit frequency) which is also the frequency at which data bits will appear on the output of the system and the frequency at which redundant bits will appear in the output of the system. The output 117 of the frequency divider 115 may be fed to a pulse counter 119 which will detect the end of a block of data. The output of the pulse counter 119 may be fed to a flip-flop 150, the output 148 of which will control the transfer of remainder bits from the shift register 122 to the shift register 122'. The clocking pulses appearing on the output 117 of the frequency divider 115 are fed to AND circuits 114 and 124 to control respectively the output of data bits from the encoding system and the feedback within shift register 122 during the redundancy calculation process. The clocking pulses appearing on line 117 are inverted by inverter circuit 152 before being fed to AND circuit 126 to control the timing of the output of remainder bits from the system on line 154. Data output line 116 and redundancy output line 154 may then be OR'ed together to produce a system output comprised of data and redundancy bits alternating with each other.

The operation of this embodiment of the invention is as follows. Assume that two consecutive blocks of data comprise the binary bits 101011 and 011101. The remainder calculated for each of these blocks of data will be 100101 and 100010 respectively. After the data bits 101011 have passed through the system, the remainder bits 100101 (reading from high order to low order) will be in the shift register 122. That is, there will be a 1 in stage six, a 0 in stage five, a 0 in stage four, a 1 in stage three, a 0 in stage two and a 1 in stage one of the shift register 122. After a message (comprised of the data bits 101011 and the remainder bits from a previous block of data) has been transmitted, and before the next block of data bits enters the system, line 148 will be energized to transfer the contents of shift register 122 through the AND circuits 141–146 into the auxiliary shift register 122'. As soon as the transfer is effective, line 148 will be de-energized and each stage of the shift register 122 will be reset to zero before the next block of data enters the system. The pulse appearing on line 148, delayed by an appropriate amount of time, may be used as the reset pulse. As the next block of data (011101) enters the system, the timing pulses appearing on line 117 will control the timing of data bits which leave the system through AND circuit 114 and will control the feedback to the various stages of the shift register 122 through AND circuit 124. The clocking pulses on line 117, inverted by inverter circuit 152, will furnish timing information to control the shifting of the previously calculated remainder 100101 through the AND circuit 126 to the redundancy output line 154. Data output line 116 and redundancy output line 154 may feed the two inputs of an OR circuit 156 so that the redundancy bits calculated from the previous block of data will be interleaved between the data bits leaving the system. Thus, the message appearing on the output line 158 of the system will contain the bit sequence 011010110011 wherein the first, third, fifth, seventh, ninth and eleventh bits are the data bits 011101 and the second, fourth, sixth, eighth, tenth and twelfth bits are the remainder bits 100101 that were calculated for the previous block of data. After all of the bits in the message have been transmitted, a pulse appearing on line 148 will cause a transfer of the newly calculated remainder 100010 from shift register 122 to shift register 122' and the transmission process will continue with a new block of data.

In the above discussion a "half-rate" error correcting code (i.e., a code in which the number of remainder bits is equal to the number of data bits in a block) was used in the examples. However, it will be understood by those skilled in the art that this invention will be used to advantage with other codes. For example, assume that a code is used wherein the number of error checking and correcting bits generated is equal to one-half the number of data bits. When such a code is used, one-third of the bits in a transmitted message will be error detecting and correcting bits while the remaining two-thirds of the bits in the message will be data bits. Perhaps the simplest way of implementing such a code in accordance with this invention would be to interleave remainder bits and data bits on a one-for-one basis until a block of remainder bits is exhausted and then interleave dummy zeros between the remaining data bits. Although such a technique would utilize many of the advantages of this invention, it would be somewhat wasteful of message space because one-fourth of each message would consist of the dummy zeros. For this reason, when using a code in which the remainder bits comprise one-third of the total message, it is preferred that the remainder bits be interleaved with the data bits on a "one-for-two" basis. That is, one remainder bit will follow each two data bits. In such a system, the output bit frequency would then be one and one-half times the input bit frequency. Similarly, if a code were to be used in which one-fourth of the transmitted message is comprised of redundancy bits, then the preferred technique would be to have one remainder bit follow each three data bits. The output bit frequency would then be one and one-third times the input bit frequency.

The implementation of a receiver to receive and decode the messages sent by any of the encoding systems described above is quite simple and straight forward. Each received message is broken down into a block of data and a remainder. Each remainder is then used in conjunction with the data that was separated out from the previously transmitted message to calculate a check word which will be used in the error detection and correction process. The messages will then be in exactly the form that they would be in if transmitted by the prior art encoder shown in FIG. 1 and they can be processed by any of a variety of prior art error detection and correction devices.

Figure 5:
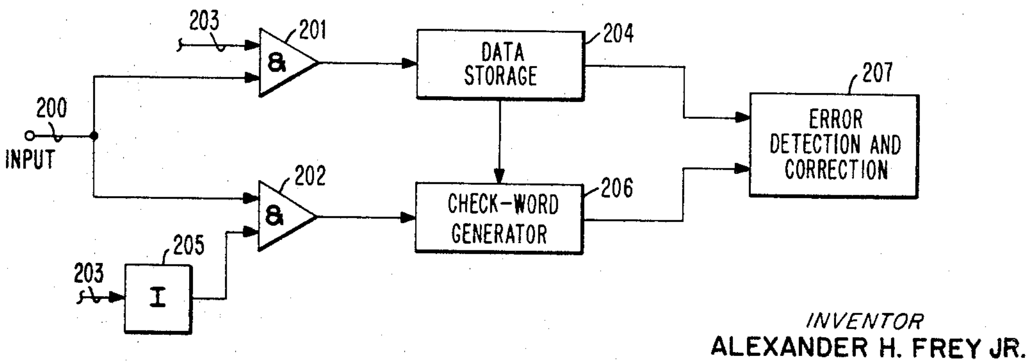
FIG. 5 shows one way of reconstructing messages transmitted by this invention.

Since the relative positions of data bits and redundancy bits within a transmitted message will generally be known, any one of a great variety of ways for dividing the message into its component blocks of data bits and remainder bits may be used. For example, as shown in FIG. 5, a message coming in on input line 200 could be fed to AND circuits 201 and 202. Clocking pulses appearing on line 203 would permit the data bits of the message to pass through AND circuit 201 to the data storage unit 204 where they will be stored until the remainder bits that were calculated for that block of data are received. The remainder bits will be received in the next message. The clocking pulses appearing on line 203, after inversion by the inverter circuit 205, will permit remainder bits to pass through the AND circuit 202 to a check-word generator 206. The check-word generator 206 is also fed by the data storage unit 204. A check word which is to be used for error detection and correction purposes will be calculated in the check-word generator 206. Then the received data bits and the calculated check word will be sent to the error detection and correction circuitry 207 for further processing. After the transmitted remainder bits have been used in the check-word generator 206 to calculate the check word, they are no longer needed and need not be stored within the system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Encoding transmission system comprising:

a source of first signals;

input control means having $n$ distribution lines, said input control means connected to said source of first signals for detecting the beginning of each of said first signals and switching successive ones of said first signals to successive ones of said $n$ distribution lines;

$n$ encoding means, each of said $n$ encoding means connected to one of said $n$ distribution lines of said input control means, each of said $n$ encoding means developing and storing a second signal derived from one of said first signals;

a combining means connected to said source of first signals and to said $n$ encoding means for combining said second signal in one of said encoding means with the one of said first signals from said source of said first signals which follows the first signals from which said second signal was derived, said combining means having an output line for transmitting a continuous flow of said combined first and second signals wherein said first signals are transmitted without delay and without interruption.

2. The encoding transmission system of claim 1 wherein the value of $n$ is equal to 2.

3. An encoding transmission system comprising:

a source of first signals;

input control means having two distribution lines, said input control means connected to said source of the first signals for detecting the beginning of each of said first signals and switching successive ones of said first signal to alternate ones of said two distribution lines;

a first and second encoding means, each of said encoding means connected to one of said distribution lines of said input control means, each of said encoding means having a first means for developing a second signal from a first signal as said first signal passes uninterruptedly through said first means onto a first output line of said encoding means and a second means connected to said first means for storing and for applying said second signal onto a second output line of said encoding means;

a combining means connected to said first and second output lines of said first and second encoding means for combining a first signal appearing on said first output line of one of said first and second encoding means with second signal appearing on said second output line from the remaining one of said first and second encoding means, said combining means having an output line for transmitting a continuous flow of said combined first and second signals wherein said first signals are transmitted without delay and without interruption.

4. The encoding transmission system of claim 3 wherein:

said combining means comprises first, second and third OR circuits, each having two inputs and an output;

one input of said first OR circuit connected to said first output line of said first encoding means, the other input of said first OR circuit connected to said first output line of said second encoding means;

one input of said second OR circuit connected to said second output line of said first encoding means, the other input of said second OR circuit connected to said second output line of said second encoding means; and one input of said third OR circuit connected to the output of said first OR circuit, the other input of said third OR circuit connected to the output of said second OR circuit.

5. In a coding transmission system comprising:

a source of serial continuous first signals;

an encoding means connected to said source of first signal for developing a second signal derived for each of said first signals;

an auxiliary storage means connected to said encoding means;

transfer means connected to said encoding means and to said auxiliary storage means for transferring said second signal from said encoding means to said auxiliary storage means after said second signal has been developed; and combining means connected to said source of first signal and to said auxiliary storage means for combining said second signal in said auxiliary storage means with the one of said first signals from said source of first signals which follows the first signal from which said second signals were derived, said combining means having an output line for transmitting a continuous serial flow of said combined first and second signals wherein said first signals are transmitted without delay and without interruption.

References Cited

UNITED STATES PATENTS

| | | | |
|---|---|---|---|
| 3,231,858 | 1/1966 | Tuomenoksa et al. | 340—146.1 |
| 3,319,223 | 5/1967 | Helm | 340—146.1 |
| 3,335,409 | 8/1967 | Heller et al. | 340—146.1 X |
| 3,381,273 | 4/1968 | Stark et al. | 340—146.1 |

MALCOLM A. MORRISON, Primary Examiner

CHARLES E. ATKINSON, Assistant Examiner